(12) United States Patent
Ikuta

(10) Patent No.: US 6,513,421 B2
(45) Date of Patent: Feb. 4, 2003

(54) SUBDIVIDING APPARATUS FOR INGREDIENTS-CONTAINED SOUP

(76) Inventor: Kazumasa Ikuta, Green Corp. 301, 3-2, Horiguchi, Kanagawa-Ku, Yokohama (JP)

( * ) Notice: Subject to any disclaimer, the term of this patent is extended or adjusted under 35 U.S.C. 154(b) by 0 days.

(21) Appl. No.: 09/885,971

(22) Filed: Jun. 22, 2001

(65) Prior Publication Data

US 2002/0038605 A1 Apr. 4, 2002

(30) Foreign Application Priority Data

Oct. 4, 2000 (JP) ........................................ 2000-304770
May 18, 2001 (JP) ........................................ 2001-148825

(51) Int. Cl.$^7$ .............................. A23L 1/00; A23L 1/40; A23L 1/0522
(52) U.S. Cl. .............................. 99/348; 99/352; 99/355; 99/483
(58) Field of Search .................... 99/348, 344, 331, 99/352, 355, 357, 483, 342, 343; 366/145, 147, 196, 183; 222/54, 64, 105, 183, 146.5, 235, 443; 221/92, 101, 150 A, 150 HC, 203

(56) References Cited

U.S. PATENT DOCUMENTS 3,638,557 A * 2/1972 Ljung ........................... 99/348
4,357,111 A * 11/1982 Honemeyer et al. ........ 366/145
4,993,593 A * 2/1991 Fabiano et al. ........... 99/348 X
5,363,747 A * 11/1994 Clark et al. .................... 99/348
6,006,657 A 12/1999 Ikuta ........................... 99/331

FOREIGN PATENT DOCUMENTS

| JP | 06-179491 | 6/1994 |
| JP | 08-53198 | 2/1996 |
| JP | 2000-226100 | 3/2000 |

* cited by examiner

Primary Examiner—Reginald L. Alexander
(74) Attorney, Agent, or Firm—Armstrong, Westerman & Hattori LLP

(57) ABSTRACT

A subdividing apparatus capable of subdividing ingredients and soup liquid every approximately given quantity without separating ingredients from soup liquid and capable of subdividing efficiently frozen dry soup. The apparatus for subdividing ingredients-contained soup into soup liquid containing an approximately given quantity of ingredients, comprises a container having a stirring blade for stirring ingredients-contained soup, a constant-quantity tube having an opening communicated with an opening at the lower end of the container and an extrusion rod closely fitted so as to be slidable with the constant-quantity tube, wherein the forward and backward operation of the extrusion rod is carried out so as to maintain a state free from entry or discharge of air.

9 Claims, 5 Drawing Sheets

SUBDIVIDING APPARATUS FOR INGREDIENTS-CONTAINED SOUP

BACKGROUND OF THE INVENTION

1. Field of the Invention

This invention relates to a subdividing apparatus capable of subdividing soup such as miso soup, curry and the like every approximately given quantity without separating ingredients from soup, and capable of providing efficient subdivision even where frozen dry soup or the like is used.

2. Description of the Related Art

In board out industries, restaurants, dining rooms in factories and the like when about 10 to 20 liters of canned food or retort, miso soup of frozen food, curry, corn soup, corn chouder or the like cooked in advance in separate locations are put into a large pot which are always heated to offer clients, the soup or the like has been ladled out by eye measure every predetermined quantity into a container while stirring it by a spoon.

Since soup or the like is always heated as described above it has been necessary to stir it frequently so as not to burn. Because of this, an exclusive-use worker need be employed to pose a problem that soup or the like becomes high in cost in terms of personal expenses. In addition, further problems were that unevenness in mixed quantity of ingredients occurs; since soup or the like is stirred frequently, ingredients get out of shape; and since a lid is opened every time of subdivision, dust or insects (or bugs) are mixed into soup, which is very unsanitary.

Further, soup has been heated only when offering to clients without heating always. In this case, however, there is a problem that sine it takes some time till soup is heated, soup cannot be offered to clients immediately.

For solving the problem as noted above, the present applicant has developed an apparatus which has been applied for a patent previously, in which a rod-like member (a screw valve) formed with a spiral angle is used to subdivide soup into a predetermined quantity so as not to be burned.

However, the above-described apparatus was very epoch-making in terms of solving the problem, but had difficulty that the apparatus price is high. In addition, recently, frozen dry soup, which is ingredients-contained soup obtained by adding water to powder and stirring and heating, is widely being used. In this proposal, a lump results unless soup is stirred while adding a small quantity of water when soup is stirred through a conventional screw valve, sufficient stirring could not be accomplished. Therefore, the above-described apparatus poses a problem that it takes time to subdivide soup, failing to obtain desired work efficiency of subdivision. A further problem was that even those other than frozen dry soup when a plurality of soup are exchanged and subdivided, the efficiency of subdividing work is not obtained satisfactorily similarly to that mentioned above.

SUMMARY OF THE INVENTION

It is an object of this invention to provide a subdividing apparatus capable of subdividing every approximately given quantity of ingredients and soup without separating the latter.

It is a further object of this invention to provide a subdividing apparatus capable of subdividing soup efficiently even when frozen dry soup is used.

It is another object of this invention to provide a subdividing apparatus capable of exchanging and subdividing a plurality of kinds of soup without trouble.

It is another object of this invention to provide a subdividing apparatus, according to which ingredients is hard to get out of shape.

It is another object of this invention to provide a subdividing apparatus which eliminates the possibility that a worker suffers from a burn, and which reduces the temperature raising time.

It is still another object of this invention to provide a subdividing apparatus capable of simplifying the apparatus to offer it at low costs.

For achieving the aforementioned objects, the present invention provides an apparatus for subdividing ingredients-contained soup into soup liquid containing an approximately given quantity of ingredients, comprising a container having stirring blade for stirring and mixing ingredients-contained soup, a constant-quantity tube having an opening communicated with an opening at the lower end of the container and an extrusion rod closely fitted so as to be slidable with the constant-quantity tube, wherein the forward and backward operation of the extrusion rod is carried out so as to maintain a state free from entry or discharge of air.

The forward and backward operation of the extrusion rod may be carried out so as to maintain a state free from entry or discharge of air such that the extrusion rod comes in contact with soup in a state that the extrusion rod has become extruded, the extrusion rod is moved backward to a position, and at the same time, ingredients-contained soup is pulled into the constant-quantity tube.

The ingredients-contained soup used in the present invention is soup in which ingredients is mixed approximately uniformly by stirring it by the stirring blade, and preferably, soup is subdivided while stirring.

Preferably, a cross-section of the container used in the present invention is circular or approximately circular. By using such a container as described, it is possible to effectively prevent ingredients from getting out of shape at the time of stirring.

In the present invention, preferably, the stirring blade are disposed at the lower part of the container, and the stirring blade are alternately rotated to left and right so that the ingredients and soup are mixed approximately uniformly.

Preferably, a tube is rotatably fitted in a stirring blade receiving chamber at the lower end of the container, an opening is formed at the outer circumference opposite surface of the tube, whereby when one opening comes in communication with the interior of the container, the other container comes in communication with the constant-quantity tube.

A cut-off valve having a constant-quantity tube is mounted on a frame (a server body), and an opening at the lower end of the container and the cut-off vale are detachably connected to thereby subdivide without trouble a plurality of kinds of soup or soup formed by adding water to frozen dry soup and stirring and heating.

For making the container having the stirring blade received therein detachable, a rotational shaft of the stirring blade and a rotational shaft of a motor may be detached through both fitting members having a fitting concave part and a fitting convex part, respectively.

The opening of the constant-quantity tube and the opening at the lower end of the container are put together, and the extrusion rod is moved back from the extruded position to a predetermined position whereby a predetermined quantity of ingredients and soup liquid are received into a chamber having a predetermined volume, after which the constant-quantity tube is rotated to coincide a discharge port formed in the lower surface of the cut-off valve with the opening of the constant-quantity tube, and the extrusion rod having the constant-quantity tube fitted therein is moved forward to thereby introduce ingredients and soup into a predetermined container.

In short, according to the present invention, the forward and backward operation of the extrusion rod is carried out so as to maintain a state free from in and out of air (a vacuum state) whereby even in the stirring state, subdividing can be done smoothly, and since the stirring blade are mounted, subdividing can be done efficiently even in a case where frozen dry soup is used.

Further, the container having soup received therein and a frame connected to the container to form a subdividing apparatus are made detachable whereby a plurality of kinds of soup can be exchanged and subdivided efficiently.

The above and other objects and advantages of the invention will become more apparent from the following description.

DETAILED DESCRIPTION OF THE PREFERRED EMBODIMENTS

The preferred embodiments of the present invention will be explained hereinafter.

Figure 1:
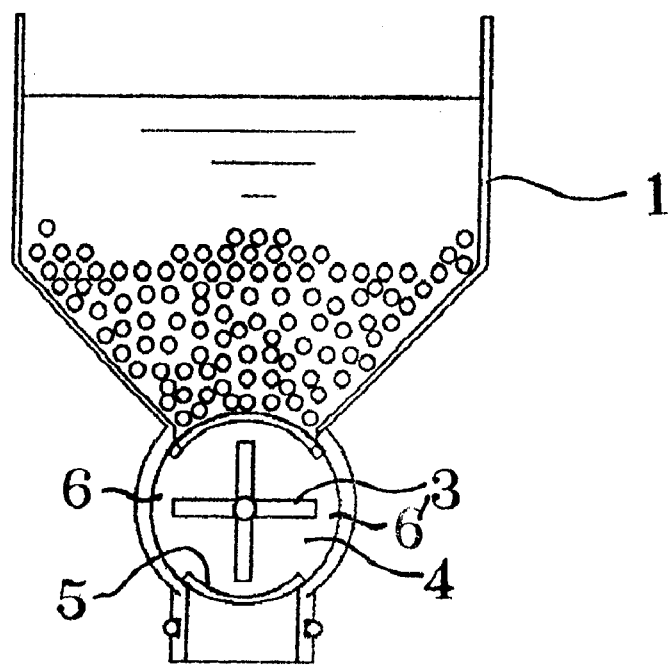
FIG. 1 is a sectional view showing one example of a container having stirring blade mounted thereon according to the present invention.
Figure 2:
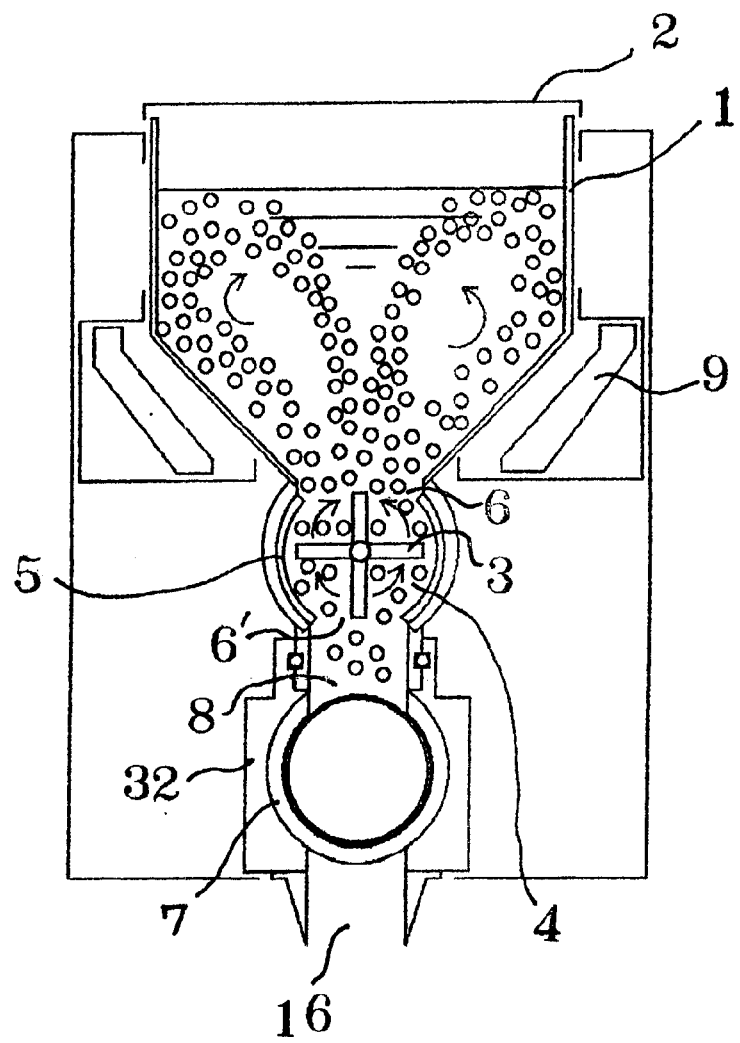
FIG. 2 is a schematic sectional view showing one embodiment of the present invention.
Figure 4:
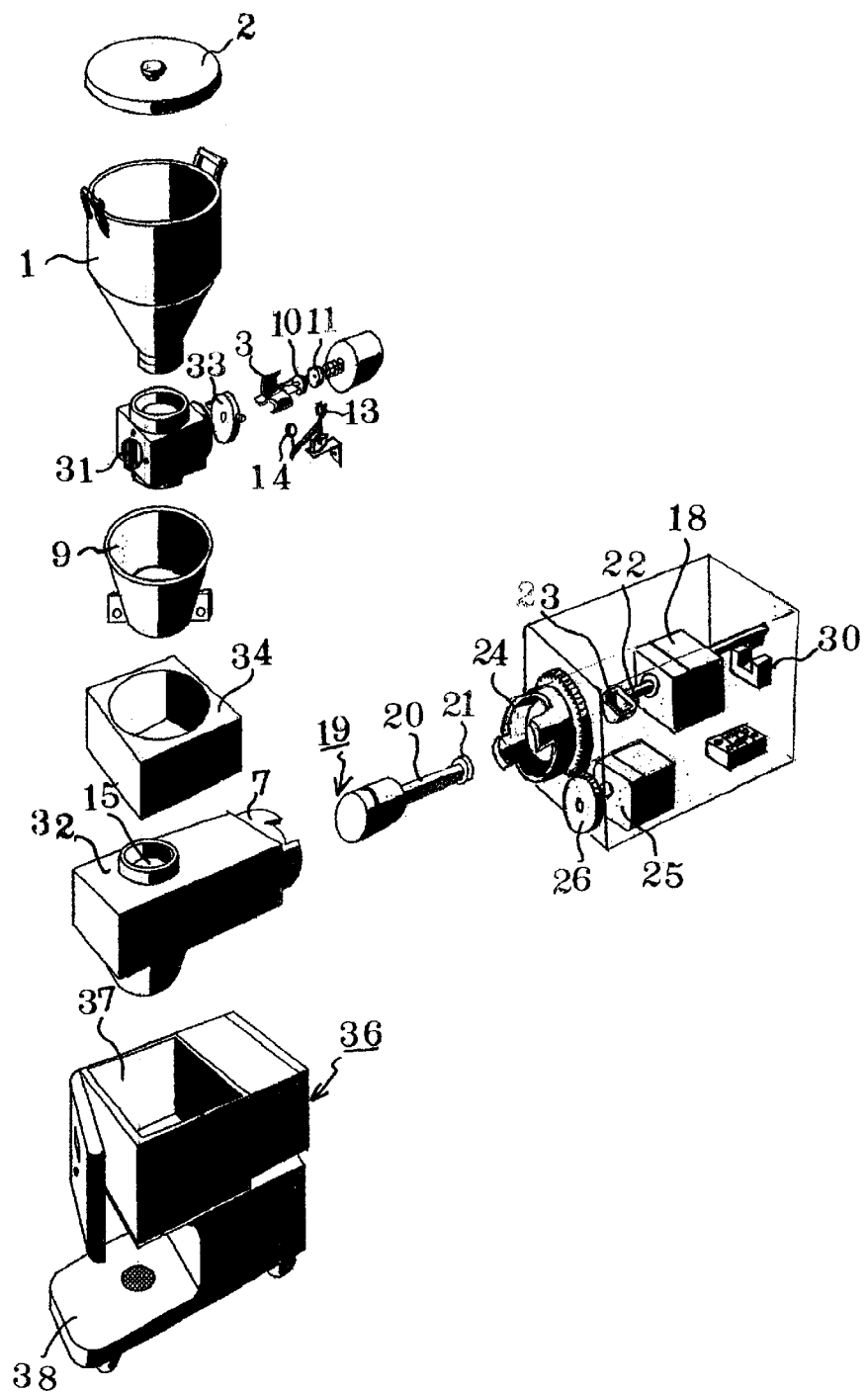
FIG. 4 is an exploded perspective view showing one embodiment of the present invention.

FIGS. 1 and 2 show one embodiment of the present invention. A lid 2 is placed over a container 1, and a cylindrical stirring blade receiving chamber 4 is connected to the lower part of the container 1. A tubular inner valve 5 is fitted in the cylindrical stirring blade receiving chamber 4, and openings 6 and 6' are formed in the outer peripheral opposite surface of the inner valve 5. As shown in FIG. 2, when one opening 6 is communicated with the interior of the container 1, the other opening 6' is communicated with an opening 8 of a constant-quantity tube 7. The inner valve 5 is opened or closed by turning an open-and close valve handle 31 shown in FIG. 4 provided on the stirring blade receiving chamber 4.

As shown in FIG. 2 the container 1 having the stirring blade 3 shown in FIG. 1 received therein is detachably connected to a cut-off valve body (an outer valve) 32 having a constant-quantity tube 7 rotatably received therein. The cut-off valve body (outer valve) 32 and the constant-quantity tube 7 constitute a rotary valve (a cut-off valve).

Soup liquid may be heated to 65 to 100° C. preferably, 65 to 70° C. but heating means is not particularly limited. For example, in the present apparatus the outside of the container 1 is heated by an induction heater 9, and soup liquid may be stirred by the stirring blade 3 at given intervals so as not to be burned. When the induction heater 9 is used for heating, it is preferred because there is no possibility that a worker is burned and the temperature rising time is shortened. In the embodiment shown in FIG. 4, the induction heater 9 is formed to be a convergent cylindrical shape downward and placed over the lower part of the container 1, and a hopper cover 34 is fitted over the outside thereof.

As shown in FIG. 2, in a case where soup liquid is heated, rotation may be made for 5 to 15 seconds to left (or right), and then rotation may be made for 5 to 15 seconds to left (or right) opposite thereto. By doing so, ingredients can be mixed approximately uniformly to effectively prevent burning. Then, stirring is stopped for 5 to 15 seconds, which forms one cycle, and this cycle may be repeated similarly. In case of subdividing, stirring is not stopped, but dividing may be done while carrying out the left or right rotation alternately for a given period of time.

In the above-described embodiment, the container 1 is formed to have a shape in which a conical body is connected to the lower end of a cylindrical body. This may not always be so, but it has been assured from experiments that a container in which a cross-section of the container 1 is circular (for example, cylindrical or conical) is employed to thereby effectively prevent ingredients from getting out of shape at the time of stirring.

Figure 3:
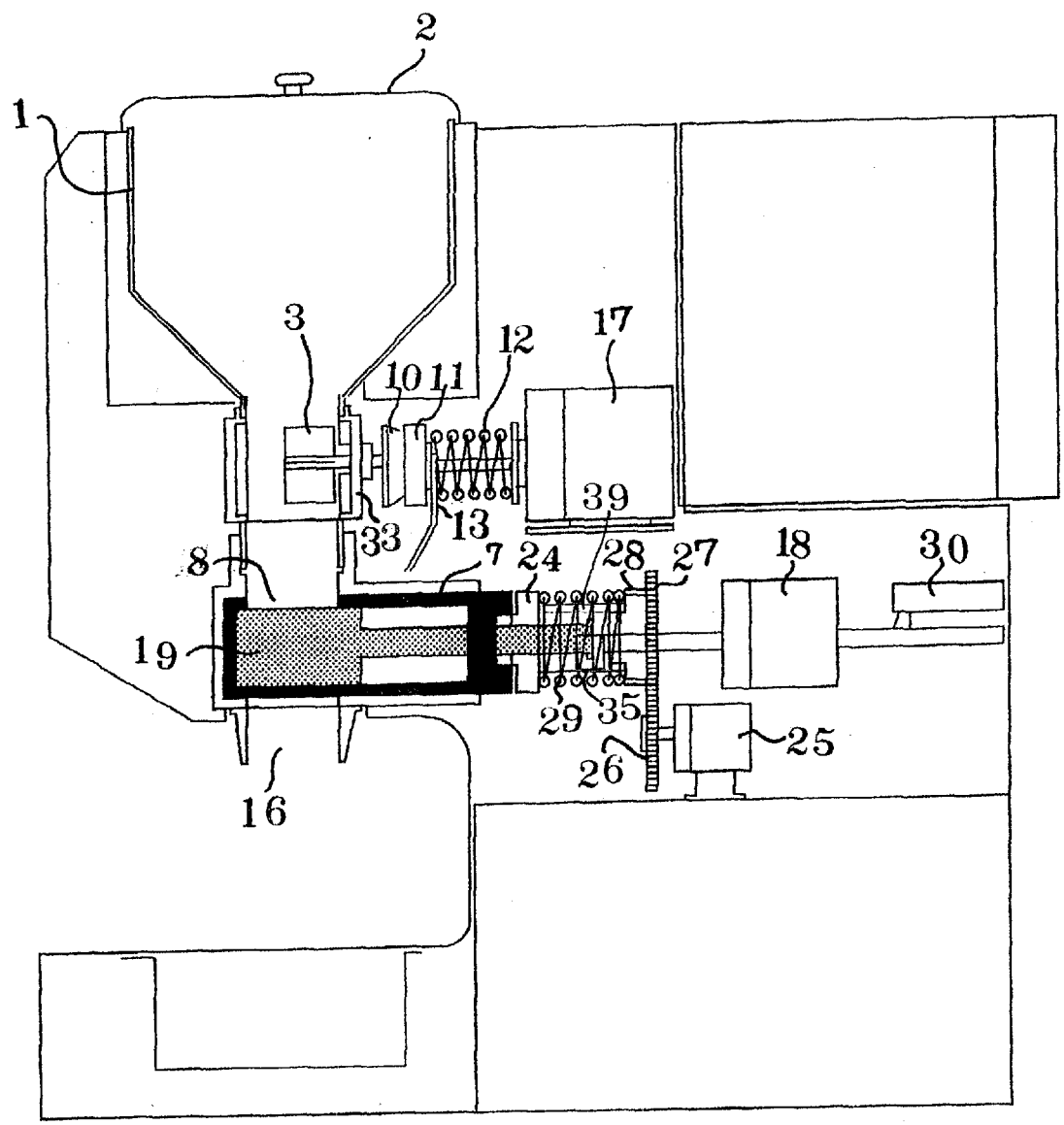
FIG. 3 is a schematic sectional view showing one embodiment of the present invention.

As shown in FIGS. 3 and 4, a conical fitting convex member 10 and a fitting concave member 11 are secured to a rotational shaft of the stirring blade and a rotational shaft of a motor 17, respectively, and both the fitting members 10 and 11 are biased by a coil spring (a stirring blade press spring) 12 to come in elastic contact.

While in the above-described embodiment, since the fitting concave member 10 is formed of rubber, it is not slipped, it is noted of course that the member may be fitted so as not to skid by using well-known fitting means.

In order to prevent both the fitting members 10 and 11 from separating during stirring, a U-shaped clutch 13 is loosely fitted in the rotational shaft to prevent the fitting concave member 11 from its backward movement. A lever 14 of the clutch 13 is pushed down to allow the clutch 13 to stand up, and the lever 14 is raised upward to fall the clutch 13. As the stopper means, of course, other well-known means may be used. In FIGS. 3 and 4, reference numeral 33 designates a stirrer seal cover.

The container 1 shown in FIG. 1 shows an example in which a replaceable cartridge pot is constituted, and is fitted to be detachable in an upper end opening 15 of a cut-off valve body 32 as shown in FIG. 2. Accordingly, in a state that the clutch 13 is fallen, the fitting concave member 11 is pushed backward and moved to thereby remove the container 1.

The cut-off valve body 32 is formed at upper and lower ends thereof with openings 15 and 16, respectively, the upper end opening 15 being communicated with a lower end opening of the container 1, and the lower end opening (discharge port) 16 and the upper end opening 15 may be communicated with the opening 6 of the constant-quantity tube 7.

The extrusion rod 19 is closed fitted in the constant-quantity tube 7 to be moved forward and backward freely by a piston control motor 18 which rotates in both directions. The extrusion rod 19 is constituted by connecting a piston part to the extreme end of a rod 20.

A rear end of the rod 20 is formed on a cylindrical convex projection 21 which is fitted in a cup-like connection clutch 23 of the rod 22 which is moved forward and backward by the piston control motor 18.

As shown in FIG. 3, a convex part of a cylindrical cut-off valve clutch 24 is fitted in a notch at the rear end of the constant-quantity tube 7, and a female (internal) hole (not shown) of a key formed in the inner surface of the cut-off valve clutch 24 is slidably fitted in a male (external) key (convex) 39 fitted in a member 28 having a gear 27.

A clutch spring (coil spring) 29 is interposed between the cut-off valve clutch 24 and the member 28 having the gear 27. Accordingly, the cut-off valve clutch 24 is biased to the rear end of the constant-quantity tube 7, and when the cut-off valve clutch 24 is moved backward against the force of the coil spring 29, it can be separated from the rod 20 and the cut-like connection clutch 23. FIG. 4 shows a state that the cut-off valve clutch 24 is pushed backward and stopped by a stopper.

Being constituted as described above, the cut-off valve control motor 25 is rotated whereby the constant-quantity tube 7 is rotated through the gear 26 secured to the rotational shaft of the cut-off valve control motor 25, the member 28 having the gear 27 meshed with the gear 26, and the cut-off valve clutch 24. In the figure, numeral 30 designates a capacity sensor, which controls a backward position of the extrusion rod 19 according to a preset subdividing capacity.

Soup is prepared from frozen dry soup, as shown in FIG. 2, by putting powdery frozen dry soup into the container 1, adding a small quantity of water and stirring, further adding a small quantity of water while stirring, and after given water has been added, heating it to a predetermined temperature by a heater, and subdividing it without modification or placing in the state shown in FIG. 1 to hold it in a suitable container as a spare.

In FIG. 4, an opening 37 of a server body 36 is a receiving chamber of the container 1 provided with a stirring blade, and the cut-off valve body 32 is detachably disposed at the lower part of the container 1.

In the following, the using method of the apparatus according to the present invention will be explained.

In the state shown in FIG. 2, the stirring blade 3 is rotated to left (or right) for 10 seconds, then to right (or left) for 10 seconds, and thereafter stirring is stopped for 10 seconds. This cycle is repeated. When a temperature in the container 1 reaches a predetermined temperature (for example, approximately 80° C.), the heater is turned off, and when a temperature of soup is lowered to a predetermined temperature (for example, approximately 65° C.), the heater is turned on.

Then, while repeating a cycle in which the stirring blade 2 is rotated to left (or right) for 10 seconds, and then to right (or left) for 10 seconds, the extrusion rod 19 is pulled to a backward predetermined position (decided according to the subdividing capacity) from the state shown in FIG. 3, that is, the state that the opening at the lower end of the container is placed in registration with the opening 8 of the constant-quantity tube to push the extrusion rod 19, ingredients and soup liquid are introduced into the constant-quantity tube 7. Since the soup is subdivided in the state being stirred and uniformly dispersed as described, the soup is subdivided into soup liquids containing ingredients approximately uniformly.

After the chamber of the constant-quantity tube 7 has been filled, when the constant-quantity tube 7 is rotated through 180° from the state shown in FIGS. 2 and 3, the opening at the lower end of the container is closed, and ingredients and soup liquid are fallen into the subdividing container on the removing cup cradle 38 from the discharge port 16 of the cut-off valve body 32 in communication with the opening of the constant-quantity tube 7. Since the extrusion rod 19 is caused to move forward simultaneously, all the ingredients and soup liquids internally of the constant-quantity tube 7 can be discharged.

When the constant-quantity tube 7 is rotated through 180° to return to the state shown in FIGS. 2 and 3, one cycle is completed. During one cycle, no air flows into the rotary valve, and in the forward and backward movement of the extrusion rod 19, the vacuum state is maintained.

Figure 5:
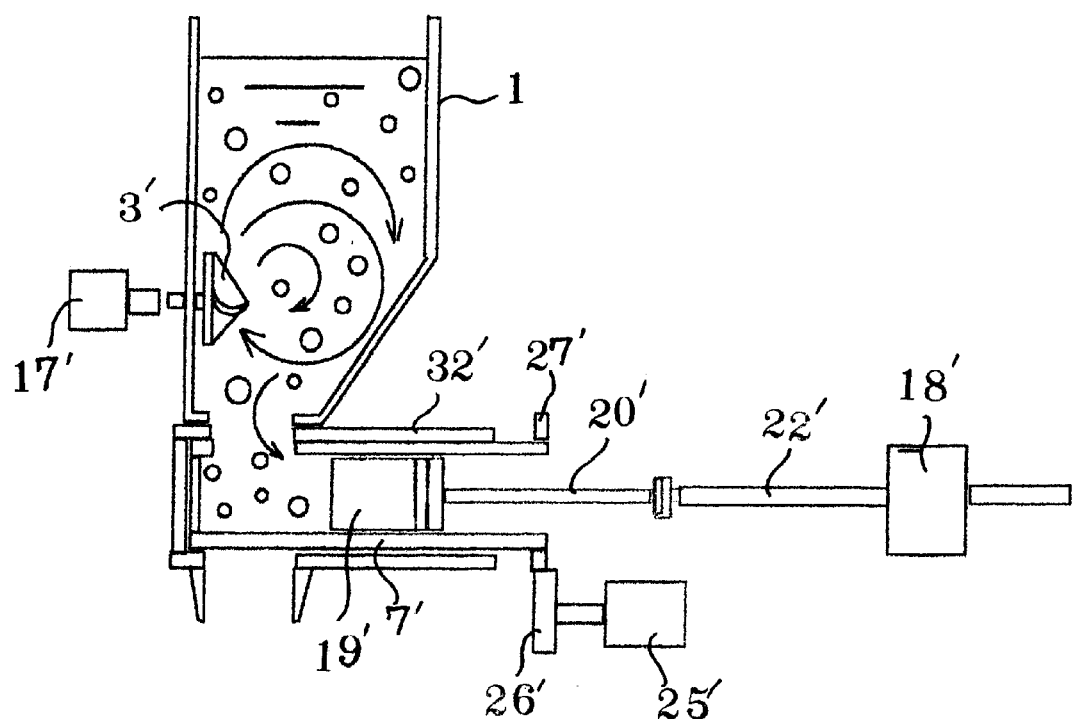
FIG. 5 is a schematic sectional view showing another embodiment of the present invention.

FIG. 5 shows another embodiment in which a stirring blade 3' rotated by a stirring motor 17' is mounted on the wall somewhat lower than the central part of a container 1', an outer tube (cut-off valve body) 32' is disposed in the opening at the lower end of the container, and a constant-quantity tube 7' is rotatably fitted in the outer tube. An extrusion rod 19' is closely fitted in the constant-quantity tube 7' to be moved forward and backward freely by a piston control motor 18'. The rear end of a rod 20' of the extrusion rod and the extreme end of a rod 22' are fitted to be detachably mounted similarly to the embodiment described previously. A gear 27' is mounted at the rear end of an outer tube 32', and the gear 27' is meshed with a gear 26' secured to the rotational shaft of a motor 25'. The stirring motor 17', the stirring motor 18' and the stirring motor 25' are secured to a housing, and the constant-quantity tube 7', an outer tube (outer valve) 32' and the stirring blade 3' may be separated from the housing.

FIG. 5 shows the state that ingredients-contained soup is introduced into the constant-quantity tube 7', but the subdividing operation itself may be carried out in a manner similar to the embodiment described previously. That is, also in this embodiment, no air flows into the rotary valve, and in the forward and backward movement operation, the vacuum state is maintained.

In the present invention, the stirring blades may be provided vertically within the container as in the normal stirring device. In this case, it is convenient that the stirring blades are replaced according to the kind of ingredients-contained soup to be subdivided.

Further, it is convenient that a POS (point-of-sale-system) function is provided on the device of the present invention, and a register is utilized so as to control sale simultaneously. By doing so, the devices installed at many places can be controlled readily at one location.

The device according to the present invention may be used as a device not only for subdividing soup for each person but also for subdividing and filling it for several to scores of persons.

The apparatus according to the present invention can be applied without trouble to those having an object in which soup having ingredients mixed therein such as miso soup, curry, and soup is subdivided every portion for one person. The apparatus is particularly suited to exchange and subdivide a plurality of kinds of soup or to subdivide soup prepared from frozen dry soup.

The apparatus according to the present invention is mainly used for the purpose of subdividing every portion for one person to offer it to clients, but can be also used for the purpose of filling and subdividing soup every predetermined quantity to bottles or cans sold by a dispenser. In short, the apparatus can be used for any uses if an object is to subdivide soup.

In the present invention, since soup in the state that stirred ingredients are mixed approximately uniformly is subdivided, it is not necessary to use a screw valve for measuring ingredients, thus enabling simplification of the apparatus of the present invention and formation thereof at extremely low cost.

Further, since the container having soup received therein, and the frame having the cut-off valve connected to the container to form a subdividing apparatus mounted thereon are made detachable, any soup can be exchanged and subdivided efficiently.

According to the present invention, the screw valve is not used, but the stirring blade is rotated to stir and mix soup whereby the distribution quantity to soup of ingredients can be made approximately constant, and therefore the apparatus is extremely simplified, and the maintenance cost can be reduced, thus enabling a supply of the apparatus at extremely low costs.

Further, since the stirring blade is mounted, soup prepared from frozen dry soup can be subdivided without any trouble; and since subdividing is made in the closed state free from a flow of air, there is no possibility that insects or dust are mixed into soup, an extremely sanitary condition is maintained, and subdividing can be made without trouble even in the stirring state.

Furthermore, if the container having the stirring blade mounted thereon can be detachably mounted on the frame, a few containers can be used by a single frame (a server body), and therefore, in a case where a plurality of kinds of soup are subdivided, subdividing can be made extremely efficiently.

The entire disclosure of Japanese Patent Application No. 304770 filed on Oct. 4, 2000 and Japanese Patent Application No. 148825 filed on May 18, 2001 including specification, claims, drawings and summary are incorporated herein by reference in its entirety.

What is claimed is:

1. An apparatus for subdividing ingredients-contained soup into soup liquid containing an approximately given quantity of ingredients, comprising a container having a stirring blade for stirring ingredients-contained soup, a constant-quantity tube circularly movably fitted in an outer tube and having an opening communicated with an opening at the lower end of the container and an extrusion rod closely fitted so as to be slidable with the constant-quantity tube, wherein the forward and backward operation of the extrusion rod is carried out so as to maintain a state free from entry or discharge of air.

2. The subdividing apparatus according to claim 1 wherein said container having the stirring blade and a frame are formed to be detachable.

3. The subdividing apparatus according to claim 1 Wherein said ingredients-contained soup is soup in which ingredients are mixed approximately uniformly, and is subdivided while stirring.

4. The subdividing apparatus according to claim 3 wherein a cross-section of said container is circular or approximately circular.

5. The subdividing apparatus according to claim 3 wherein the stirring blade is disposed at the lower part of said container, said stirring blade being rotated to right and left alternately whereby said ingredients and soup are mixed approximately uniformly.

6. The subdividing apparatus according to claim 5 wherein a tube is rotatably fitted in a stirring blade receiving chamber at the lower end of said container, openings are formed in outer peripheral opposite surfaces of said tube, and when said one opening is communicated with the interior of said container, the other opening is communicated with said constant-quantity tube.

7. The subdividing apparatus according to claim 6 wherein a cut-off valve having said constant-quantity tube is mounted on the frame, and the opening at the lower end of said container and said cut-off valve are connected to be detachable.

8. The subdividing apparatus according to claim 7 wherein a rotational shaft of said stirring blade and a rotational shaft of a motor are brought into elastic contact to be detachable through both fitting members having a fitting concave part or a fitting convex part.

9. The subdividing apparatus according to claim 8 wherein the opening of said constant-quantity tube is coincided with the opening at the lower end of said container, and said extrusion rod is moved backward to a predetermined position from the extruded position whereby a predetermined quantity of ingredients and soup liquid are received into a chamber having a predetermined capacity, after which said constant-quantity tube is rotated to coincide a discharge port formed in the lower surface of an outer valve housing the constant-quantity tube therein with an opening of said constant-quantity tube, and said extrusion rod fitted in said constant-quantity tube is moved forward to thereby remove ingredients and soup liquid into a predetermined container.

* * * * *